United States Patent [19]
Van Gorkom et al.

[11] Patent Number: 5,637,954
[45] Date of Patent: *Jun. 10, 1997

[54] FLAT-PANEL TYPE PICTURE DISPLAY DEVICE WITH ELECTRON TRANSPORT DUCTS AND A DOUBLE SELECTION STRUCTURE

[75] Inventors: Gerardus G. P. Van Gorkom; Siebe T. De Zwart; Petrus H. F. Trompenaars; Nicolaas Lambert, all of Eindhoven, Netherlands

[73] Assignee: U.S. Philips Corporation, New York, N.Y.

[*] Notice: The term of this patent shall not extend beyond the expiration date of Pat. No. 5,489,815.

[21] Appl. No.: 494,530

[22] Filed: Jun. 28, 1995

Related U.S. Application Data

[63] Continuation of Ser. No. 998,188, Dec. 29, 1992, Pat. No. 5,489,815, which is a continuation-in-part of Ser. No. 830,951, Feb. 6, 1992, Pat. No. 5,313,136, which is a continuation of Ser. No. 528,677, May 24, 1990, abandoned, and Ser. No. 954,949, Sep. 30, 1992, abandoned, which is a continuation of Ser. No. 637,039, Jan. 3, 1991, abandoned, which is a continuation-in-part of Ser. No. 528,677.

[30] Foreign Application Priority Data

Jan. 3, 1992 [EP] European Pat. Off. ............... 9220016

[51] Int. Cl.$^6$ ............ H01J 29/70; H01J 01/62; H01J 63/04; G09G 03/10
[52] U.S. Cl. ............ 313/422; 313/495; 315/169.1
[58] Field of Search ............ 313/489, 495, 313/496, 497, 422, 486; 315/169.1, 169.3

[56] References Cited

U.S. PATENT DOCUMENTS

| | | | |
|---|---|---|---|
| 5,347,199 | 9/1994 | Van Gorkom et al. | 313/422 |
| 5,489,815 | 2/1996 | Van Gorkom et al. | 313/422 |

*Primary Examiner*—Sandra L. O'Shea
*Assistant Examiner*—Mack Haynes
*Attorney, Agent, or Firm*—Robert J. Kraus

[57] ABSTRACT

Flat-panel type picture display device having a face plate with a luminescent screen at the inner side and, arranged at a short distance therefrom, a rear plate adjoined by a large number of electron transport ducts operating by means of wall interaction of electrons. An active selection structure for directing electrons from transport ducts towards pixels on the luminescent screen comprises an apertured preselection plate and an apertured fine-selection plate, each preselection aperture being associated with at least two fine-selection apertures. Special auxiliary (or dummy) electrodes between the preselection plate and the selection plate, and/or a special geometry of the preselection apertures ensure that colour purity and contrast are maximal.

5 Claims, 5 Drawing Sheets

FLAT-PANEL TYPE PICTURE DISPLAY DEVICE WITH ELECTRON TRANSPORT DUCTS AND A DOUBLE SELECTION STRUCTURE

CROSS-REFERENCE TO RELATED APPLICATIONS

This application is a continuation of U.S. patent application 07/998,188 filed on 29 December 1992, now U.S. Pat. No. 5,489,815, which is a continuation-in-part of: U.S. patent application 07/830,951 filed on 6 February 1992, now U.S. Pat. No. 5,313,136, which is a continuation of U.S. patent application 07/528,677 filed on 24 May 1990 ab; and of U.S. patent application 07/954,949 filed on 30 September 1992 ab, which is a continuation of U.S. patent application 07/637,039 filed on 3 January 1991 ab, which is a continuation-in-part of U.S. patent application 07/528,677 filed on 24 May 1990 ab.

BACKGROUND OF THE INVENTION

The invention relates to a picture display device having a vacuum envelope which is provided with a transparent face plate bearing a luminescent screen having a multiplicity of predefined areas (pixels) and with a rear plate, said display device comprising a plurality of juxtaposed sources for emitting electrons, a plurality of electron current transport ducts cooperating with the sources md extending substantially parallel to the face plate and an active selection structure for selectively extracting electron currents from the transport ducts and for directing said currents towards pixels of the luminescent screen.

The display device described above is of the flat-panel type, as disclosed in EP-A-400 750, corresponding to U.S. Pat. No. 5,313,136, and EP-A-436 997 corresponding to U.S. Pat. No. 5,347,199. U.S. Pat. Nos. 5,313,136 and 5,347,199 are hereby incorporated by reference. Display devices of the flat-panel type are devices having a transparent face plate and, arranged at a small distance therefrom, a rear plate, which plates e.g. are interconnected by means of side walls a:ad in which the inner side of the face plate is provided with pixels in the form of a phosphor pattern, one side of which is provided with an electrically conducting coating (the combination generally being referred to as luminescent screen). If (video information-controlled) electrons impinge upon the luminescent screen, a visual image is formed which is visible via the front side of the face plate. The face plate may be flat or, if ,desired, curved (for example, spherical or cylindrical).

The known display device comprises a plurality of juxtaposed sources for emitting electrons, local electron transport ducts cooperating with the sources and each having walls of high-ohmic, electrically substantially insulating material having a secondary emission coefficient suitable for transporting emitted electrons in the form of electron currents and colour selection means comprising selectively energizable electrodes (selection electrodes) for withdrawing each electron current from its transport duct at predetermined extraction locations facing the luminescent screen, further means being provided for directing extracted electrons towards pixels of the luminescent screen for producing a picture composed of pixels.

The operation of the known picture display device is based on the recognition that electron transport is possible when electrons impinge on an inner wall of an elongate evacuated cavity (referred to as "compartment") defined by walls of a high-ohmic, electrically substantially insulating material (for example, glass or synthetic material), if an electric field of sufficient power is generated in the longitudinal direction of the "compartment" (by applying an electric potential difference across the ends of the "compartment"). The impinging electrons then generate secondary electrons by wall interaction, which electrons are attracted to a further wall section and in their turn generate secondary electrons again by wall interaction. The circumstances (field strength E, electrical resistance of the walls, secondary emission coefficient $\delta$ of the walls) may be chosen to be such that a substantially constant vacuum current will flow in the "compartment".

Starting from the above-mentioned principle, a flat-panel picture display device can be realised by providing each one of a plurality of juxtaposed "compartments", which constitute transport ducts, with a column of extraction apertures at a side which is to face a display screen. It will then be practical to arrange the extraction apertures of adjacent transport ducts along parallel lines extending transversely to the transport ducts. By adding selection electrodes arranged in rows to the arrangement of apertures, which selection electrodes are energizable by means of a first (positive) electric voltage (pulse) for withdrawing electron currents from the "compartments" via the apertures of a row, or which are energizable by means of a second (lower) electric voltage if no electrons are to be locally withdrawn from the "compartments", an addressing means is provided with which electrons withdrawn from the "compartments" can be directed towards the screen for producing a picture composed of pixels by activating the pixels.

However, a drawback of the known structure is that there are as many extraction apertures as there are pixels. Consequently, this increases, inter alia, the number of drive circuits required for driving the selection electrodes and decreases the extraction efficiency.

SUMMARY OF THE INVENTION

It is an object of the invention to provide a display device of the type described in the opening paragraph, which device requires a smaller number of drive circuits and has a higher extraction efficiency.

To this end the display device according to the invention is characterized in that the active selection structure comprises a preselection structure having extraction locations which can be activated and communicate row by row with the transport ducts and a selection plate having apertures which can be activated and are each associated with a pixel, each activatable extraction location of the preselection structure being associated with at least two activatable apertures of the selection plate, and in that means for intercepting unwanted electrons are arranged between each transport duct and the associated selection apertures.

As will be further described, it is possible to realise, inter alia, a reduced number of drive circuits and a better extraction efficiency with the structure according to the invention having a number of preselection extraction locations which is reduced with respect to the number of pixels, and associated (fine-)selection apertures which can be activated by means of fine-selection electrodes. This is a very flexible concept. For example, single preselection and fine selection in three parts are feasible (for example, fine selection for three colours). An alternative possibility is, for example, preselection in two or three parts and fine selection in six or nine parts.

The preselection structure may comprise a preselection plate provided with (extraction) apertures constituting the extraction locations, which apertures are provided row by row with strip-shaped preselection electrodes connected to a circuit to which, in operation, preselection voltages are applied. If preselection electrodes in the form of gauze strips or perforated strips are used, the preselection plate may be dispensed with.

In this stepped selection system it is important to prevent electrons which have "leaked" out of the transport ducts from being accelerated towards the screen where they activate unwanted pixels (referred to as direct hits). A solution is to provide an intermediate spacer having ducts connecting the extraction locations with the associated fine-selection apertures. The thicker the intermediate spacer, the smaller the risk of direct hits. If the intermediate spacer is not to be made too thick, the invention provides the following solutions guaranteeing colour purity; and contrast.

In accordance with a first solution, which prevents electrons from going straight on from a transport duct to the wrong, unaddressed colour pixel, the active selection structure comprises a preselection plate having extraction apertures and a selection plate-having apertures which can be activated, each extraction aperture of the preselection plate being associated with at least two activatable apertures of the selection plate and each extraction aperture having an entrance portion and an exit portion, the projection of each exit portion on the selection plate being situated between the at least two selection apertures with which the extraction aperture is associated.

Each extraction aperture may have parallel walls, may be tapered or may have a stepped composite shape.

A further solution is characterized in that the preselection electrodes are arranged on the surface of the preselection plate facing the rear wall of the device. This provides a satisfactory extraction of the electrons from the electron duets, while the risk of unwanted electrons impinging from the preselection plate onto the luminescent screen is reduced. To minimize current drawing of the preselection electrodes in this situation, a plurality of parallel perforated strips or gauze strips can be used instead of a pattern, metallized on the preselection plate, of conductors which are pierced at the location of the preselection apertures. These strips may be carried by the intermediate spacer. The preselection plate can then be dispensed with.

An effective and relatively simple solution of guaranteeing a satisfactory contrast and a satisfactory colour purity is to arrange an auxiliary or dummy electrode for intercepting unwanted electrons between each extraction location and the associated selection apertures. The dummy electrodes may be electrically connected in a row pattern. If the fine-selection electrodes are separately driven, all dummy electrodes may convey the same voltage. If corresponding fine-selection electrodes are capacitively interconnected in one group or in a plurality of-groups so as to reduce the number of drive circuits, it is preferable to provide the dummy rows with the required (pulse) voltage from a selection circuit individually, or per group or groups of corresponding dummy rows.

In all these cases it is advantageous that the space between the preselection plate and the selection plate is continuously "in the transport mode" in operation. To this end the selection electrodes and/or the dummy electrodes are connected to a circuit for applying, in operation, a higher DC voltage to these electrodes than to the preselection electrodes. Without this measure there is the risk that said space charges negatively, whereafter transport is no longer possible. A restart of the transport is difficult because negative charges are difficult to remove.

BRIEF DESCRIPTION OF THE DRAWINGS

These and other aspects of the invention will be described in greater detail with reference to the embodiments described hereinafter, using identical reference numerals for the same components.

FIG. 7 shows a part of a fine-selection plate;

FIG. 8 shows an entrance portion of an electron transport duct;

DESCRIPTION OF THE PREFERRED EMBODIMENT(S)

Figure 1:
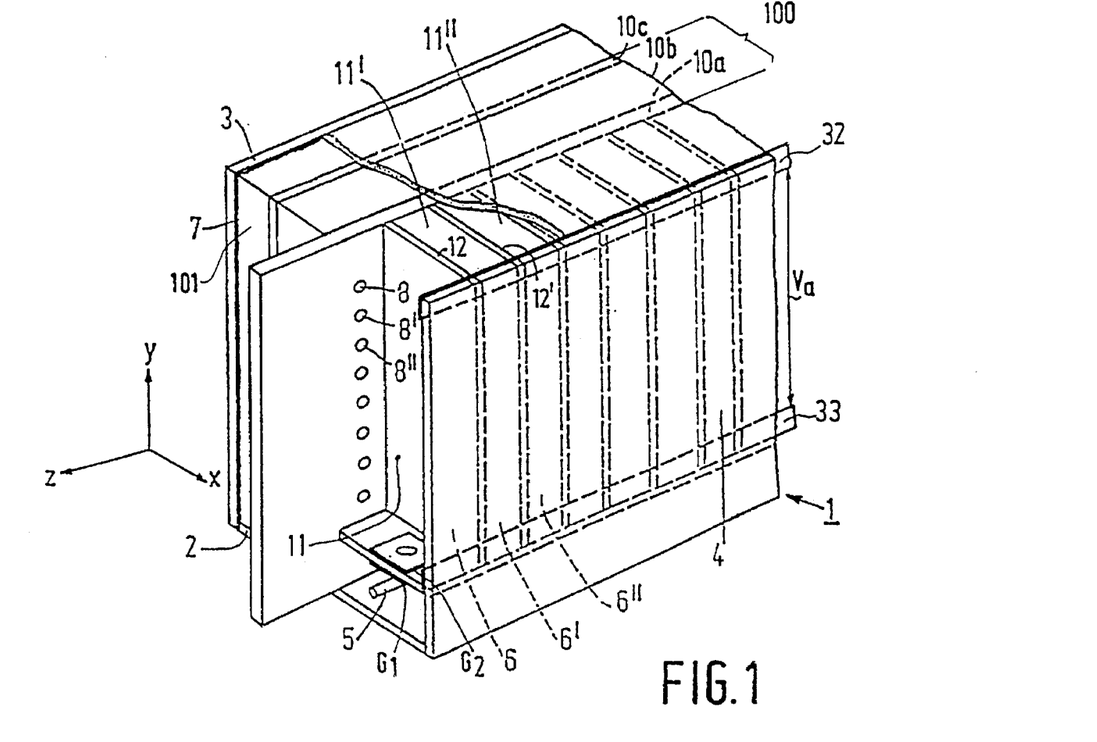
FIG. 1 is a diagrammatic perspective elevational view, partly broken away, of a part of a colour display device according to the invention with electron ducts and an active colour selection structure comprising an apertured preselection plate and an apertured fine-selection plate whose components are not shown to scale.

FIG. 1 shows a flat-panel picture display device according to the invention, having a display panel (window) 3 and a rear wall 4 located opposite said panel. A luminescent screen 7 having a repetitive pattern (rows or dots) of triplets of red (R), green (G) and blue (B) luminescing phosphor elements is arranged on the inner surface of window 3. To be able to supply the required high voltage, the luminescent screen 7 is either arranged on a transparent, electrically conducting layer (for example, ITO) or is provided with an Al backing. In a preferred embodiment the (dot-shaped) phosphor elements of a triplet are located at the vertices of a triangle.

An electron source arrangement 5, for example a line cathode which by means of drive electrodes provides a large number, for example 600, of electron emitters or a similar number of separate emitters, is arranged proximate to a wall 2 which interconnects panel 3 and rear wall 4. Each of these emitters is to provide a relatively small current so that many types of cathodes (cold or hot cathodes) are suitable as emitters. The emitters may be arranged jointly or separately. They may have a constant or a controllable emission. The electron source arrangement 5 is arranged opposite entrance apertures of a row of electron transport ducts extending substantially parallel to the screen, which ducts are constituted by compartments 6, 6', 6", . . . , etc., in this case one compartment for each electron source. These compartments have cavities 11, 11', 1", . . . defined by the rear wall 4 and partitions 12, 12', 12", . . . At least one wall (preferably the rear wall) of each compartment should have a high electrical resistance which is suitable for the purpose of the invention in at least the transport direction (suitable materials are, for example ceramic material, glass, synthetic material—coated or uncoated—) and have a secondary emission coefficient δ>1 over a given range of primary electron energies.

An axial electron transport field can be generated in the compartments by applying a potential difference across the upper and lower contacts 32 and 33.

The electrical resistance of the wall material has such a value that a minimum possible total amount of current (preferably less than, for example 10 mA) will flow in the walls in the case of a field strength in the axial direction in the compartments on the order of one hundred to several hundred Volts per cm required for the electron transport. By applying a voltage on the order of several dozen to several hundred Volts (value of the voltage is dependent on circumstances) between the row 5 of electron sources and the compartments 6, 6', 6", electrons are accelerated from the electron sources towards the compartments, whereafter they impinge upon the walls in the compartments and generate secondary electrons.

The invention utilizes the aspect disclosed in EP-A-400 750 and EP-A-436 997 that vacuum electron transport within compartments having walls of electrically insulating material is possible if an electric field ($E_y$) of sufficient power is applied in the longitudinal direction of the compartment.

The space between the compartments and the luminescent screen 7, which is arranged on the inner wall of panel 3, accommodates an active colour selection system 100 which comprises an (active) preselection plate 10a, a spacer plate 10b and an (active) (fine-)selection plate 10c. Structure 100 is separated from the luminescent screen 7 by a flu-spacer structure 101, for example an apertured electrically insulating plate. This means that the inventive display device in this embodiment largely comprises a stack of plates of electrically insulating material which are directly arranged on each other and have communicating apertures. In this connection the cavities 11, 11', . . . may be provided in the rear wall 4 so that the partitions 12, 12' cart be dispensed with. This concept leads to a very simple structure of light weight because it does not require any additional vacuum support while the front and rear walls may be relatively thin.

FIG. 2a shows in a diagrammatical cross-section a part of the display device of FIG. 1 in greater detail, particularly the active colour selection plate structure 100 which comprises a preselection plate 10a with extraction apertures 8, 8', 8", . . . and a fine-selection plate 10c with groups of apertures R, G, B. In this case three fine-selection apertures R, G, B are associated with each extraction aperture 8, 8', etc. Other numbers (for example, 4 or 6) are alternatively possible. An intermediate spacer structure 10b is arranged between the preselection plate 10a and the fine-selection plate 10c. This structure accommodates communication ducts 30, 30' having cross-sections which are chosen to suit the shape of the phosphor triplets (for example, a triangular cross-section).

Electron transport ducts 6 are formed between the structure 100 and rear wall 4. To be able to draw electrons from the transport ducts 6 via the apertures 8, 8', . . . , pierced metal preselection electrodes 9, 9', etc. are arranged on the screen-sided surface of the plate 10a.

The walls of the apertures 8, 8', . . . are preferably metallized completely or partly, but there is preferably no or little electrode metal on the surface of plate 10a on the side where the electrons land. This is done to ensure that a minimal number of electrons remain on a selection electrode during addressing (i.e. the electrode must preferably draw a minimal current).

Another solution to the problem of drawing current is to ensure that there is electrode metal on the selection plate surface where the electrons land, but this metal should then be given such a large secondary emission coefficient that the preselection electrodes do not draw any net current.

Similarly as the plate 10a, the screen-sided surface of the apertured fine-selection plate 10c is provided with (fine-)selection electrodes 13, 13', . . . for realising colour selection.

Here again the apertures are preferably metallized completely or partly. The possibility of capacitively interconnecting corresponding fine-selection electrodes (via-coupling capacitors: referred to as AC interconnection, see FIG. 2b) is important in this respect. In fact, a preselection has already en place and, in principle, electrons cannot land at the wrong location. This means that only three drive circuits, or a small number of groups of three drive circuits are required for this mode of fine-selection (fine-selection based on three colours). For example, the drive is effected as follows, but there are also other possibilities. The preselection electrodes 9, 9', . . . as well as the fine-selection electrodes 13, 13', . . . are brought to a substantially linearly increasing potential, for example by means of suitable; voltage dividing resistors (see FIG. 9 and FIG. 2b, respectively). Consecutive preselection lines are selected by applying a positive voltage pulse of, for example 200 V to the desired preselection electrode. The colour pixels are subsequently addressed by applying shorter pulses having an amplitude of, for example 300 V to the fine-selection electrodes. It must of course be ensured that the line-selection pulses are in synchronism with the video information. The video information is applied, for example, to the g electrodes in the form of a time (or amplitude-) modulated signal. The fine-selection electrodes preferably have such an electrical resistance that they safeguard the electronic circuits against breakdown from the luminescent screen.

Figure 9:
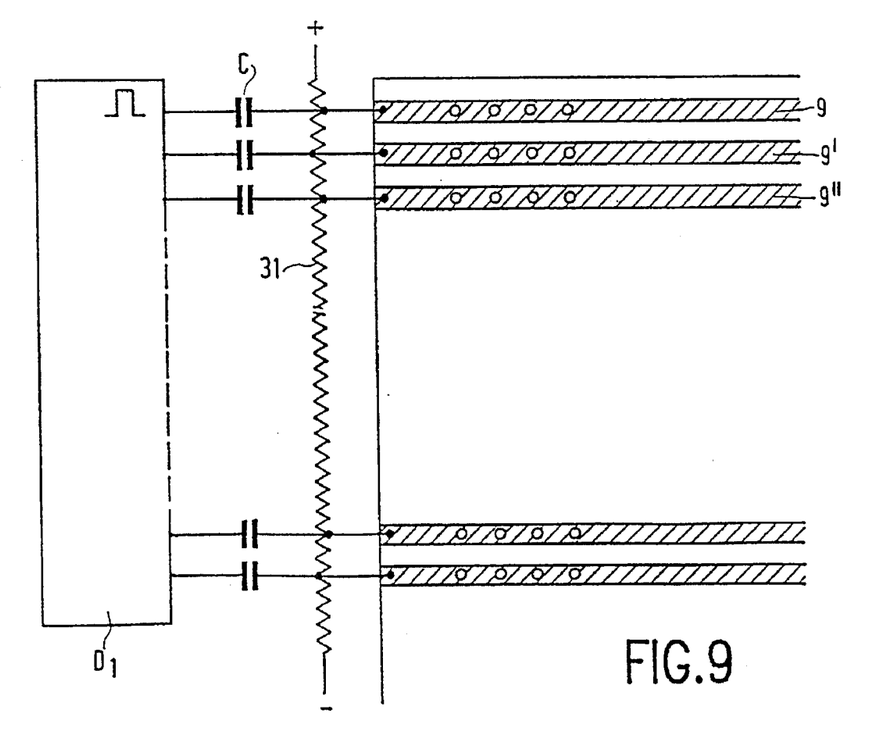
FIG. 9 shows a diagram for driving preselection electrodes.

FIG. 9 shows a diagram for driving the preselection (or line-selection) electrodes. In this diagram each preselection electrode 13, 13' is driven by the drive circuit $D_1$ via a capacitor C.

The line-selection electrodes are subjected to a linearly increasing DC voltage by connecting them to voltage dividing resistors 31. These voltage dividing resistors may be arranged proximate to the rim-of the plate carrying the preselection electrodes (which is plate 10a in FIG. 2a and 2b). The voltage dividing resistors are connected to a voltage source so that there is a sufficient transport voltage across the length of the transport ducts. It is advantageous to cause the plate carrying the preselection electrodes to project from the other plates (plate 10a FIG. 1). It may then also be used to carry the capacitors and particularly the circuit $D_1$.

To ensure that no electrons land at the wrong location, which would be at the expense of contrast and colour purity, auxiliary electrodes 14, 14', . . . (also referred to as dummy electrodes) are arranged between the electron transport ducts and the fine-selection plate 10c.

Figure 6:
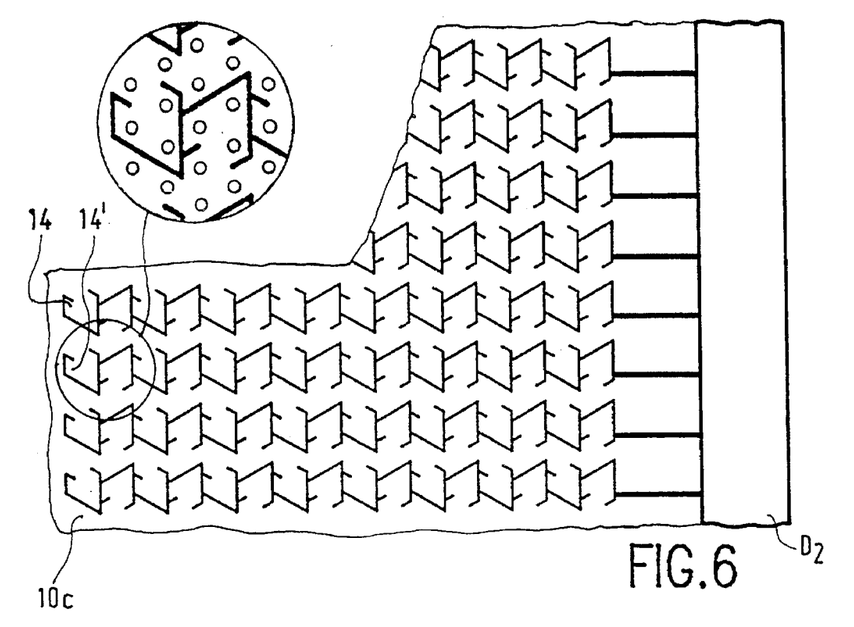
FIG. 6 shows a dummy electrode pattern.

FIG. 6 shows an embodiment of a pattern of dummy electrodes 14, 14', . . . arranged on-the surface of the fine selection plate 10c facing the, rear wall 4. These dummy electrodes 14, 14' ensure that electrons which might come from a non-addressed preselection aperture (referred to as "high hop" electrons) are collected so that they cannot reach the luminescent screen. To realise this, it is advantageous to ensure that the (horizontal) communication ducts formed in the spacer structure between the preselection plate and the fine-selection plate are always in the transport mode by giving the fine-selection electrodes and the dummy electrodes a positive voltage with respect to the preselection electrodes. The dummy electrodes of the non-addressed colour pixels are brought to a higher voltage than the adjacent fine-selection electrodes. To this end they are connected to a drive circuit $D_2$ (FIG. 6). This prevents "high hop" electrons from reaching the luminescent screen and degrading contrast, because they are collected by the dummy electrodes. When a colour pixel is being addressed, the respective fine-selection electrode is brought to a higher voltage than the adjacent dummy electrode.

Figure 3:
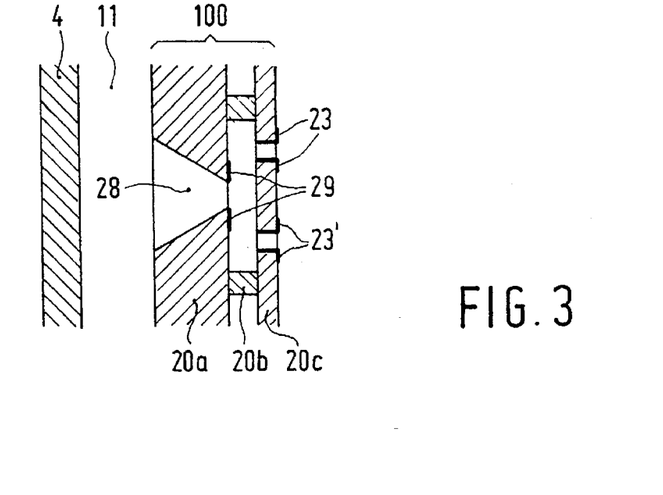
FIGS. 3, 4 and 5 show cross-sections of alternatives to the structure shown in FIG. 2.

The structure shown diagrammatically in FIG. 3 prevents electrons from passing directly from a transport duct 11 to the wrong, non-addressed colour pixel on the luminescent screen. To this end the colour selection structure 100 is provided with a preselection plate 20a having extraction apertures 28, each with an electron exit portion and an electron entrance portion. The projection of the electron exit portion of 28 onto the fine-selection plate 20c is situated between the apertures 23, 23' of the fine-selection plate 20c with which the relevant extraction aperture 28 is associated (by means of a duct formed in the intermediate spacer structure 20b) (see FIG. 7).

Figure 4:
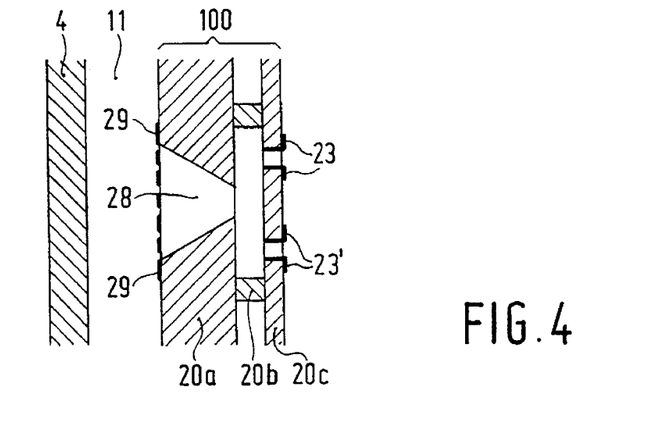
Figure 5:
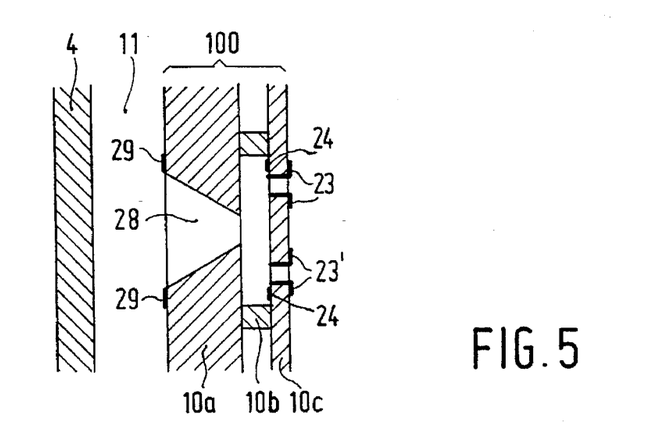

An alternative to the FIG. 3 structure is shown in FIG. 4. In this case the strip-shaped metal preselection electrodes 29, . . . are disposed in the transport ducts 11, which substantially only leads to extraction, if so desired, of substantially only electrons hopping across the rear wall 4. The preselection electrodes may have the shape of perforated metal strips, or of gauze strips. If the intermediate spacer structure, 20b is used to carry these strips, the preselection plate 20a may be dispensed with.

FIG. 8 shows diagrammatically an entrance portion of an electron transport duct 11 which is an alternative to the structure shown in FIG. 1 (in which the electrons are injected through an entrance aperture 80 in the bottom of the transport duct 11). The structure shown in FIG. 8 is characterized in that the electrons emitted by the cathode wire 5 are injected through an entrance aperture 80 in a wall of the transport duct 11.

A $G_1$ electrode or a $G_1'$ electrode is associated with each entrance aperture 80, which electrode is connected to video signal-controlled means for opening, partially opening or closing $G_1$ (for which a voltage swing of several dozen Volts is required), while a $G_2$ electrode may also be added, with which electrode, inter alia the entrance energy of the electrons which are being injected can be controlled. In this type of structure the entrance apertures of the transport ducts may be arranged in the preselection plate or in the rear wall. They may be arranged, for example at the lower or upper ends of the transport ducts, or at their lower and upper ends, or in the middle between their "upper" and "lower" ends. The latter is advantageous, particularly in larger displays. If desired, it is even possible to arrange the entrance apertures off-centre. The transport voltages which are required to draw the electrons up and down in the ducts are then different. The switching electrode denoted by $G_1$ is perforated and arranged between the cathode and the entrance aperture 80. An alternative is the $G_1'$ electrode denoted by a broken line and being arranged in such a way that the cathode 5 is between this $G_1'$ electrode and the entrance aperture 80.

An oblique entrance plate L located opposite the entrance aperture 80 is also shown by means of a broken line. This plate need not necessarily be present, but its presence does have significant advantages.

In a transport duct without an oblique entrance plate, electrons from the cathode 5 pass through aperture 80 and land on the wall 4. A landing area, for example in the form of a landing electrode, such as a lower contact 33, should be relatively broad so as to prevent hydrocarbons from the cathode 5, which are released upon activation, from reaching the insulator material of the duct. These hydrocarbons have a poor secondary emission coefficient and impede the entrance and the transport of electrons. A meted landing electrode is necessarily; a poor secondary emission coefficient of this electrode then no longer results in its charging; in fact, the potential of the electrode is fixed.

The operating performance of such an electron entrance arrangement may differ from display to display and also from transport duct to transport duct within a display, the latter giving rise to image smears. The entrance efficiency is defined as the quantity of electrons which is actually transported divided by the quantity which, after having passed $G_1$, lands on the lower contact 33. This geometry has a relatively low entrance efficiency if the transport fields are not sufficiently strong. The previous history is also important. A poorly functioning transport duct may be started or extinguished, for example, by varying the potential of $G_1$ or of the lower contact 33 (for a short time). The cause probably resides in negative charging of the side walls of the duct. A metal landing electrode, like the lower contact 33, short-circuits a part of the axial transport field so that electrons leaving this field cannot take up enough energy from the field. An accumulation of negative charge and a partial cut-off of the transport is the result. This geometry works without any problem only in the case of high transport fields.

In an improved entrance geometry a landing electrode in the form of an electrically conducting plate L is arranged obliquely opposite the entrance aperture 80. The axial transport field is not short-circuited in the direction perpendicular to the plate L, in contrast to the direction along the plate. The only remaining perpendicular component can be resolved into a component transverse to the transport direction and a component parallel to the transport direction. The latter component forces the electrons into the duct 11. Thus, the difference is that proximate to the landing electrode, in this case the oblique electrode L, energy can now be taken up from the transport field. Consequently, a sufficient transport can take place, also at relatively low transport fields. The angle at which the electrode 13 extends to the longitudinal axis of the duct 11 may be 45°, but this is not necessary.

It has been found advantageous to arrange an auxiliary electrode, or "draw electrode", on the wall 4 of the duct in order to enlarge the transport field in situ for an even better entrance. The local transport field may then be enlarged without having to enlarge the field for regular transport further down the duct; it is important to keep the latter field as low as possible.

The above-described oblique landing electrode L (possibly) combined with a draw electrode provides a satisfactory stable entrance efficiency; typically 50%–150%, dependent on the adjustment. The smears can be considerably reduced in this manner.

The oblique landing electrode may be used in a mode in which entering electrons impinge upon it, as well as in a mode in which entering electrodes are shut off (by applying a negative voltage), into the transport duct.

Figure 2:
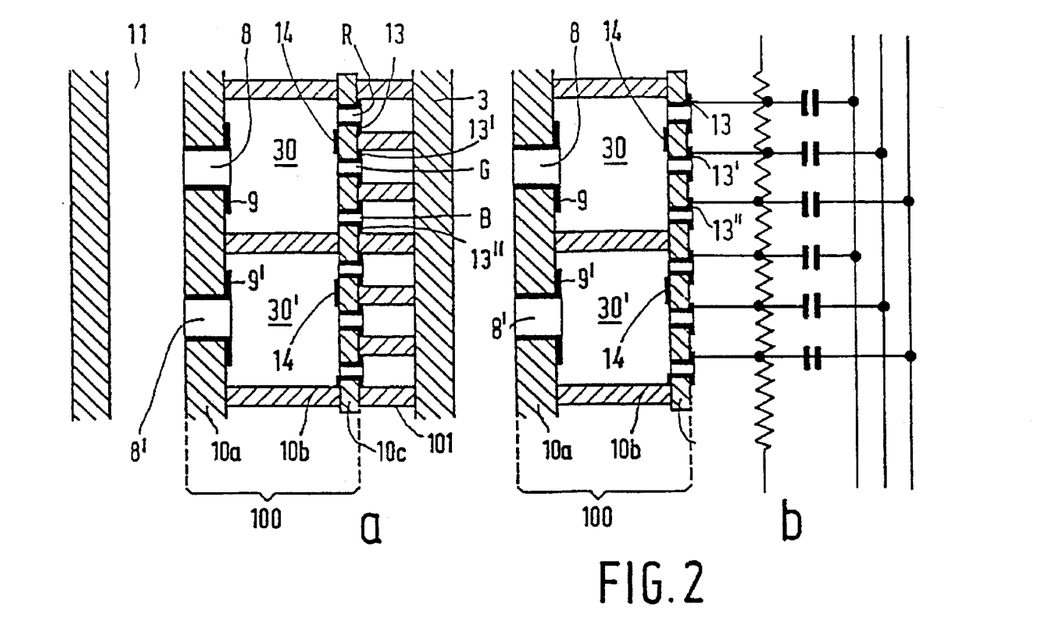
FIGS. 2a and 2b are cross-sections through a part of a device of the type shown in FIG. 1.

The flu-spacer plate 101 in FIGS. 1 and 2 may have such an apertured pattern that each flu-spacer aperture connects one fine-selection aperture with one pixel on the luminescent screen. In that case an optimum colour purity is guaranteed. However, it is alternatively possible to form the apertured pattern in such a way that each flu-spacer aperture connects at least two fine-selection apertures with at least two pixels. (This reduces the risk of breakdown. A tapered aperture shape may also be advantageous in this respect.)

The stepped selection structure has been described hereinbefore in relation to colour selection. However, the stepped selection structure can also be used to advantage for a screen luminescing in one colour, in that case for obtaining a high resolution with a minimum number of drive circuits.

It is to be noted that, in principle, the length of the electron transport ducts and the number of juxtaposed transport ducts are unimportant for the picture quality. Any aspect ratio for a display screen having a short axis and a long axis is thus possible, for example 4:3; 14:9; 16:9. The electron transport ducts are generally arranged parallel to the short display screen axis, but in some cases it may be advantageous to arrange them parallel to the long axis.

To minimize the electron transport voltage, the transport ducts should be as broad as possible. To realise this, the pitch of the transport ducts and the pitch of the triplets of pixels are decoupled. It is then possible, for example, to address two juxtaposed triplets from one transport duct (instead of two) by means of one electron emitter section (instead of two). In that case the double number of preselection electrodes is required and the emitter sections must be driven twice as fast. An example of such a dual preselection is shown diagrammatically in FIG. 10.

Figure 10:
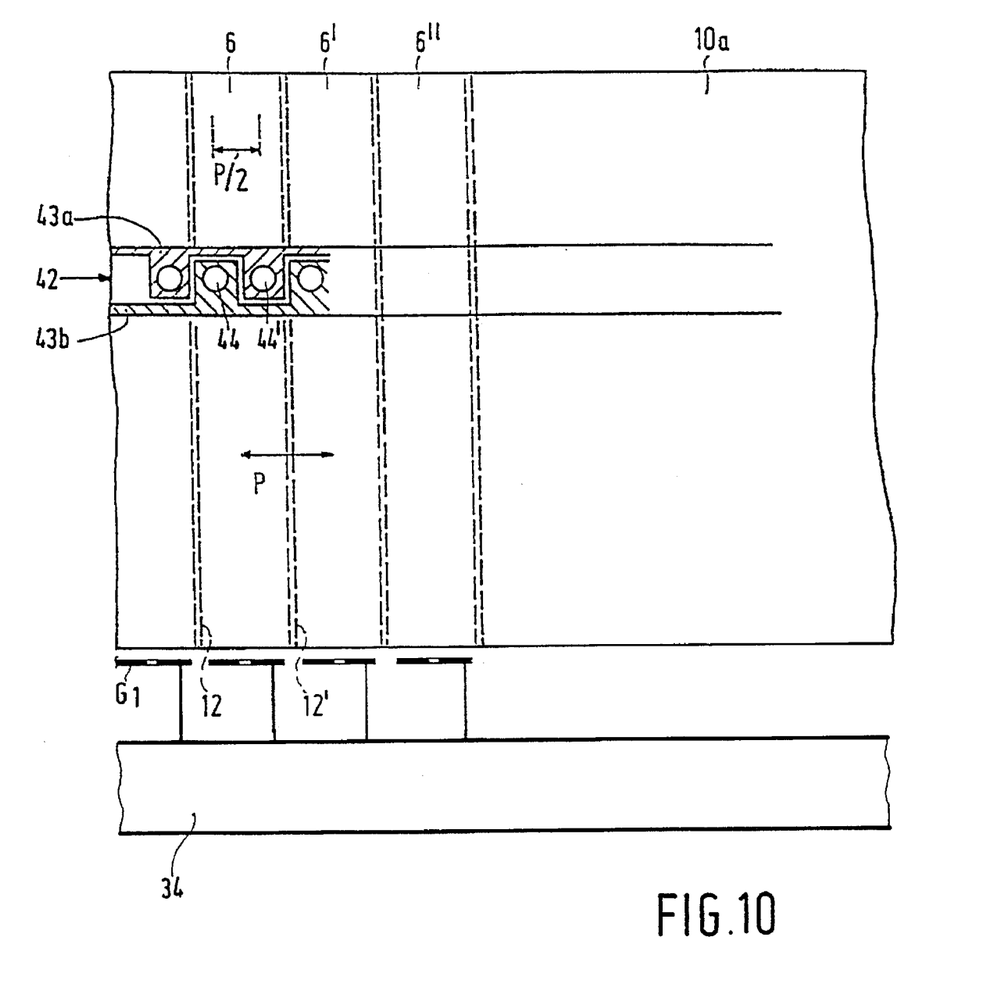
FIG. 10 is an elevational view of a special embodiment of a preselection plate for an active colour selection structure.

Each preselection electrode 42 is divided into two apertured sub-electrodes 43a and 43b in the manner shown, which simplifies contacting. In this way the horizontal resolution can be doubled without having to change the mode of operating the transport ducts 6, 6', 6", . . . (each cooperating-with one electron emitter). Three fine-selection apertures in a fine-selection plate for selecting the colours red (R), green (G) and blue (B) are associated with each preselection aperture 44, 44', . . . , for example, as is shown diagrammatically in FIG. 2a. The system described can be operated in the "multiplex" mode. This means that, for example 2×3 pixels can be driven (multiplexed) in one line period by means of one electron emitter. (Other multiplex schemes are alternatively possible.) The electron emitters with drive electrodes $G_1$ are driven by means of a video drive circuit 34.

We claim:

1. A picture display device comprising an envelope having a face plate bearing a luminescent screen comprising a multiplicity of predefined pixels, a plurality of juxtaposed sources for emitting electrons, a plurality of electron current transport ducts cooperating with the sources and extending substantially parallel to the face plate, and an active selection structure for selectively extracting electron currents from the transport ducts and for selectively directing said currents toward pixels of the luminescent screen, said active selection structure comprising:

a. a preselection structure having extraction locations which can be activated and communicate row-by-row with the transport ducts;

b. a selection plate having selection apertures which can be activated and are each associated with at least one of said pixels, each activatable extraction location of the preselection structure being associated with first and second apertures of the selection plate; and c. auxiliary electrodes, for intercepting unwanted elections, disposed along a respective electron paths from each extraction location to the associated first and second apertures of the selection plate.

2. A picture display device as in claim 1 where the auxiliary electrodes are located on a surface of an apertured plate disposed between the ducts and the luminescent screen.

3. A picture display device as in claim 2 where the apertured plate is disposed at a predetermined distance from the preselection structure.

4. A picture display device as in claim 1 where the preselection structure comprises a plate having apertures which become narrower with distance from the ducts.

5. A picture display device as in claim 2 where the auxiliary electrodes are arranged on the selection plate.

* * * * *